United States Patent [19] [11] 3,780,274
Thompson, deceased et al. [45] Dec. 18, 1973

[54] MEASUREMENT METHOD AND SYSTEM

[75] Inventors: Leon J. Thompson, deceased, late of Poughkeepsie, N.Y. by Margaret Thompson, voluntary administratrix, Poughkeepsie; Carl J. Kugler, Jr., Pleasant Valley; Garland H. Latta, Hopewell Junction, both of N.Y.

[73] Assignee: International Business Machines Corporation, Armonk, N.Y.

[22] Filed: May 10, 1972

[21] Appl. No.: 252,075

[52] U.S. Cl.. 235/151.31, 324/73 AT, 340/347 AD
[51] Int. Cl. .......................................... H03k 13/20
[58] Field of Search ................. 235/92 EL, 92 MT, 235/151.31; 324/73 R, 73 AT, 73 PC; 340/347 AD; 444/1

[56] References Cited
UNITED STATES PATENTS
3,603,772 10/1971 Paine .......................... 324/73 AT X
3,678,501 7/1972 Prill .............................. 340/347 AD Primary Examiner—Charles E. Atkinson
Assistant Examiner—R. Stephen Dildine, Jr.
Attorney—John F. Osterndorf et al.

[57] ABSTRACT

Measurement system for resolving a digital measurement of an unknown analog variable in a noise spectrum in which the spectrum is greater than or less than the least significant weighted value of the digital system. The measurement method of binary approximation is employed until the measuring system indicates once that on a comparison of vote counts the ratio of the unknown analog variable to the binary approximation has a given relationship to a predetermined criteria related to the noise spectrum. Thereafter, an incremental approximation is utilized once the criteria has been initially met to carry out a comparison of the unknown analog variable with an incremented reference and within the predetermined criteria until a voting procedure indicates that the criteria has been successively met for a given number of times. While this voting procedure takes place, the values resulting from the approximations are accumulated for the given number of succesive votes. From this accumulation, the value of the unknown variable is calculated. A look-ahead procedure is also included in the system for accelerating the realization of the initial comparison with the prescribed criteria.

8 Claims, 4 Drawing Figures

MEASUREMENT METHOD AND SYSTEM

BACKGROUND OF THE INVENTION

1. Field of the Invention

This invention relates to measurement systems and, more particularly, to a measurement method and apparatus utilizing time or voltage sampling to resolve a digital measurement of an unknown analog variable in the presence of a noise spectrum.

2. Description of the Prior Art

The resolution and measurement of high speed pulse parameters is usually accomplished in an ordinary digital measurement system. A comparator periodically measures two inputs under clock control with one of the inputs variable in accordance with the resultant output of the comparator. This variable input is typically provided by a digital to analog converter. Such measurement methods in which a given initial value is digitally modified by adding to it or subtracting from it a modifier determined by the sampling are referred to as approximation. When the modifier is divided by two each time it is used, the method is binary approximation.

In the measuring process, a logical decision is made based on the sampling. When the unknown input is greater than the variable input, the modifier is added and when less, it is subtracted. This process continues until the modifier has been reduced to a given value, usually the least significant bit, enabling the two inputs to approach each other within the weighted value of the least significant bit of the digital computer. The value of the modifier at the end of the process is the approximated measurement.

The validity of a measurement made by such a system is governed by the noise present on the comparator inputs at the instant that a comparison is made. The effect of the noise is to produce an incorrect algebraic application of the modifier and thus cause the value at the reference input to move away from the value at the unknown input rather than toward it. Since this type of measurement has a statistical probability of occurrence and the binary approximation process is terminated by sensing when the modifier has been reduced to a limiting value, the resultant measurement has a statistical precision based on the amount of noise relative to the least resolvable digital bit value.

Digital voltmeters are known which operate on these principles and often utilize some form of input filtering to reduce the effects of noise. When measurements are required on transient voltages such as the type occurring in the testing of high speed digital circuits, filtering cannot be employed.

To improve the measurement precision, the procedure is altered to allow more than one test sample per modification decision. Thus, for each value of an approximation of the reference input, a series of samples are allowed to occur and the result for each sample is accumulated in counters. One counter is employed where the value of the unknown exceeds the reference and a second where the value of the reference exceeds the unknown. The number of samples that takes place is usually determined by sensing when either of the counters reaches a predetermined value. The result of this procedure is to increase the probability of making the correct direction modification as the decision is based on a majority of votes rather than a single vote.

SUMMARY OF THE INVENTION

The principles of this invention are directed to the further enhancement of the precision of such measurements by statistically utilizing the information contained in the values of both vote counters as well as the majority information. Both time and voltage measurements are performed and the result of each sample or vote is accumulated in go/no-go counters under the control of a logical control unit responsive to a program sequence contained in a digital computer. Since the effect of noise in a system is to cause a voltage level or a pulse transition to vary with time when a measurement is made, the parameter being measured varies over the period of time when it is required that it be measured. The principles of the invention assume that the noise has a normal Gaussian distribution such that the result of a given number of votes as accumulated in the go/no-go counters is a measure of the number of occurrences when the instantaneous value of the variable is above or below the sampling threshold. The ratio of lesser total votes represents the ratio of a portion of the cumulative noise distribution to the total distribution.

According to one aspect of the invention, a look-ahead procedure of binary approximation is first employed accelerating the bringing of the system within a first set of system limitations which may be the limitations of the hardware. By using look-ahead, the speed of response of the system is enhanced. Once the system is operating within this first set of predetermined limits, measurement is made against a second set of limits which may be a pre-set criteria related to the noise spectrum. This is also accomplished by binary approximation. After the criteria is met, the binary approximation is discontinued but an incremental or tracking approximation commences. This approximation continues until the pre-set criteria is successively met a predetermined number of times. While this predetermined number of votes are measured, the results of the accumulated values of the reference variable are stored. From this cumulative stored value, an indication of the actual value of the unknown analog variable is thereafter calculated.

DESCRIPTION OF THE PREFERRED EMBODIMENTS

Figure 1:
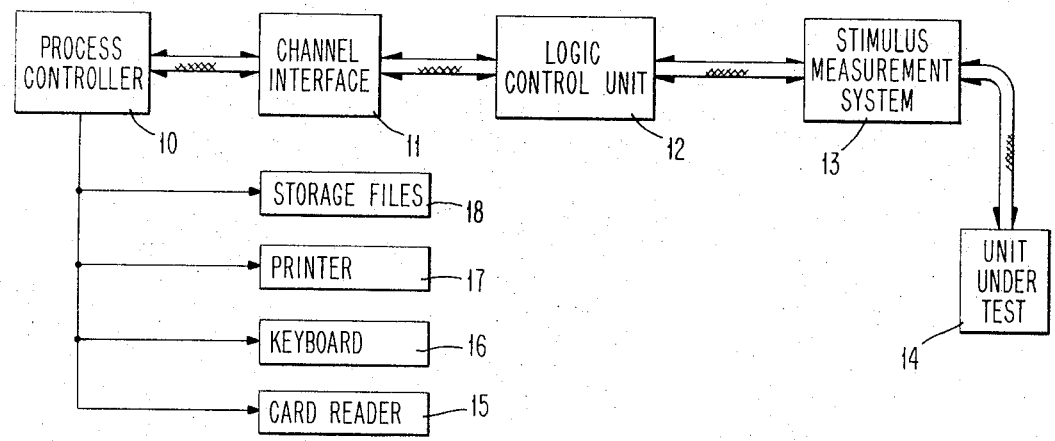
FIG. 1 is a block diagram of a configuration of a test system employing the method and apparatus of the invention.

Referring now to FIG. 1, the general configuration of a test system includes a process controller 10 coupled through a channel interface 11 to a test channel including logic control unit 12. A stimulus measurement system 13 is coupled to unit 12 and applies the test stimuli to a unit under test 14 and accepts the measurement responses from such unit.

Process controller 10, as the primary control of the test system, may take the form of an IBM 1802 process controller which is coupled to input/out devices such as a card reader 15, keyboard 16, printer 17 and storage files 18 of the magnetic tape or disc type. Process controller 10 may be connected by a communications link with an off-line data processing system such as one of the models of the IBM System 360. Communication from process controller 10 to the test channel takes place through interface 11 which may be an IBM 1826 channel interface. The input/output devices are standard for such a test system and they act to process the input/out data while the test channel performs the tests.

Logic control unit 12 is a microprogrammable logic and control unit that is test dependent. It may take the form of the central processing unit of an IBM System 360 Mod 30. Dependent on the microprogramming supplied to unit 12, a particular type of testing is performed. Stimuli are generated in system 13 which are supplied to unit under test 14. The connections are made to the input/output connectors of the unit which may be a semiconductor integrated circuit. Connection from system 13 to the unit under test is ordinarily achieved through a handler which moves the unit to be tested into a test station for application of the stimuli and measurement of the responses and thereafter accomplishes a sorting operation dependent on the results of the test.

Figure 2:
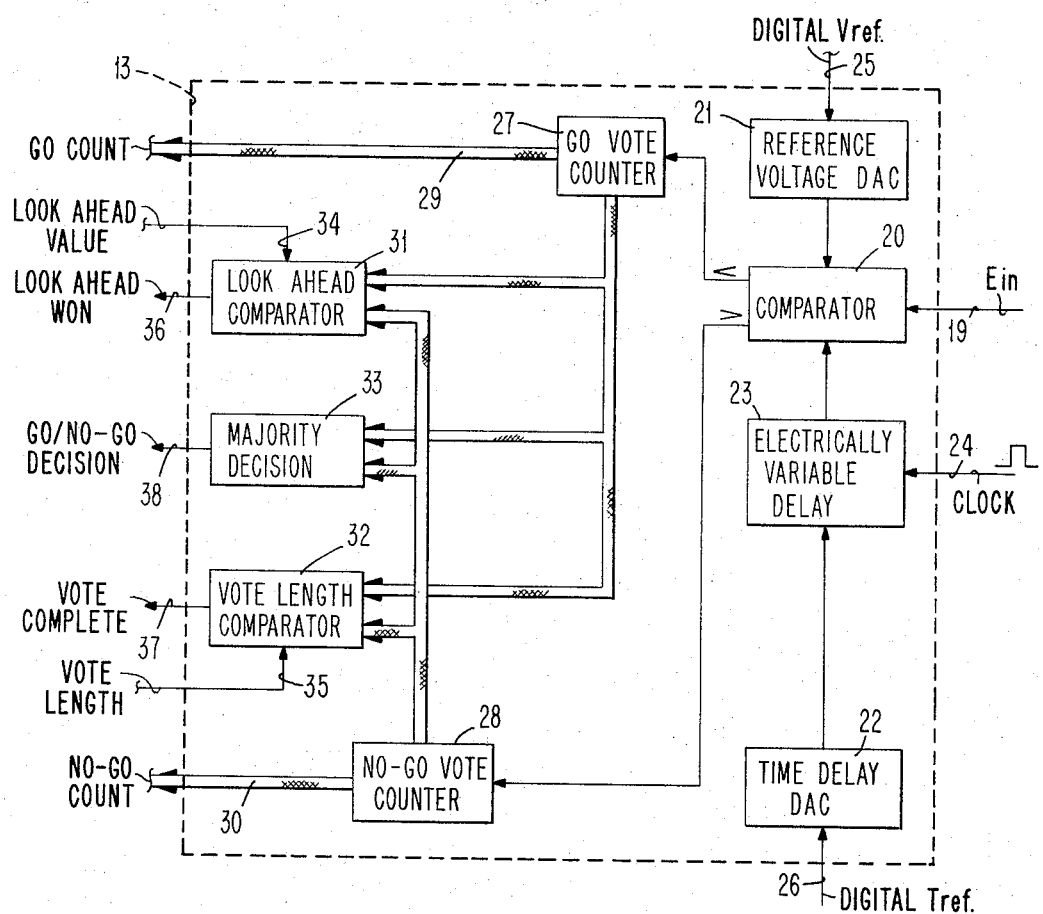
FIG. 2 is a block diagram of a portion of the stimulus measurement system of FIG. 1 showing the particular apparatus employed in carrying out the principles of the invention.

One such measurement response connection is shown in FIG. 2 at line 19 which supplies an unknown analog variable signal Ein to a comparator 20. The Ein signal represents the response detected after application of the stimuli. The circuitry shown in FIG. 2 is employed in conjunction with logic control unit 12 to effect the measurements in accordance with the principles of the invention.

To accomplish such a measurement, a determination is made as to whether the measurement is to be made with respect to a constant time reference or with respect to a constant voltage reference. Comparison is then effected with an approximated reference value. Comparator 20 is coupled to a reference voltage digital to analog converter (DAC) 21 and a time delay digital to analog converter (DAC) 22 through an electrical variable delay 23 which is varied according to a clock signal at 24. Delay 23 accepts the output from time delay DAC 22 and controls the timing when comparator 20 makes a measurement after the occurrence of clock pulse 24. The reference values are supplied to the digital to analog converters 21, 22 from logic control unit 12 through lines 25, 26.

The comparator provides outputs to go and no-go vote counters 27, 28 which in turn provide a go count at 29 and a no-go count at 30 to the logic control unit. These counts are also provided to look-ahead comparator 31, votelength comparator 32 and majority decision circuits 33. A predetermined look-ahead value (LAV) is loaded into comparator 31 from logic control unit 12 through line 34 and a predetermined votelength value (VLV) is loaded into votelength comparator 32 through line 35. The measurement circuitry provides three separate output indications: a look-ahead won indication is provided at line 36 from comparator 31; a vote complete indication on line 37 from comparator 32; and a go/no-go decision on line 38 from circuit 33.

In the performance of the test method, the first step is to reset the look ahead lost switch and the counters 27, 28 to zero (Block 41). Then the look-ahead value and votelength value are loaded into comparators 31, 32 (Block 42). Next, a determination is made as to whether the measurement is to be in the time or voltage mode (Block 43). If the mode is time, then the time and voltage input reference values are loaded into reference voltage digital to analog converter 21 through line 25 and time delay digital to analog converter 22 through line 26 (Block 44). If the mode is voltage, then the reference value for time only is obtained and loaded into time delay digital to analog converter 22 through line 26 (Block 45).

It is to be understood that all of these external measurement criteria, or prescribed criteria, that is votelength value, look-ahead value, time and voltage reference values are provided to the measuring apparatus from logic control unit and in turn from process controller 10. For a particular part number that is the unit under test, these values may be stored in files 18 ir keyed into the process control system through keyboard 16. Once the external measurement criteria are provided to logic control unit 12 and then to stimulus measurement system 13, the process controller 10 may be disconnected from the test channel until the completion of the test operations. The process controller operates under the control of a pre-loaded program or it may be responsive to operator action.

If it is assumed that the measurement mode is a voltage mode and that the time reference has been loaded into time digital to analog converter 22 (Block 45), the voltage is measured on the unknown input waveform Ein at the time specified by the time reference value. Logic control unit 12 calculates the modifier for the voltage reference from the previously supplied external measurement criteria and places this value into digital to analog converter 21. This is the step shown in Block 46. The first approximation in such a measurement mode is one-half of the voltage measurement full scale range (Block 47).

The system is now prepared to begin voting (Block 48) and counters 27, 28 are enabled and permitted to count comparisons provided from comparator 20 to counters 27, 28. When the comparison determines that Ein is greater than the approximated value, a count is recorded in Go Vote Counter 27. Similarly, when Ein is less than the approximated value, a count is recorded in No Go Counter 28. When the counts are such that the values loaded into either the look-ahead or votelength comparators 31, 32 is satisfied as indicated on lines 36, 37 voting is terminated. If neither of these values is satisfied, the voting continues (Block 49). When completed, an interrogation is made (Block 50) as to whether the look-ahead lost switch has been set. If it is assumed that look-ahead comparator 31 is satisfied first it indicates that one of the counters 27, 28 has counted to a predetermined value which is normally much less than its full scale count while the other counter still has a zero count. The predetermined value is the look-ahead value provided on line 34 to look-ahead comparator 31. The effect of this measurement is to indicate that the reference values provided to comparator 20 are still significantly far away from the input voltage value Ein provided on line 19, such that the measurement is not being made within the noise region. By the indication provided on line 36, the logic control unit is informed that a measurement has been completed.

If the look-ahead lost switch set interrogation (Block 50) indicates that the switch has been set, the logic control unit then requests the go and no-go counts provided from counters 27, 28 on lines 29 and 30 (Block 53). Interrogation is made as to whether either count is zero (Block 54). If the look-ahead lost switch was not set (Block 50), determination is made if line 36 is up (Block 51). If not, the look-ahead lost switch is set (Block 52) and then the go and no-go counts are provided to logic control unit 12 (Block 53). If the indication from the interrogation in Block 51 (look-ahead won) is positive, logic control unit 12 continues the binary approximation procedure. The modifier is halved and a determination made as to whether it is to be added or subtracted. This determination is made based on the level on Go/ No-Go decision line 38.

If the go and no-go counts have been obtained, determination is made as to whether either count is equal to zero (Block 54). If neither count equals zero, a check is made against the prescribed criteria (Block 55). If not met, the binary approximation continues. When the prescribed criteria has been initially met, the mode of measurement is changed. However, if either count is equal to zero again indicating that the look-ahead interrogation is positive, the binary approximation continues as provided in Block 56. A count of one is subtracted from the bad count and if the resultant is equal to zero (Block 57) an error flag is set and exit is made from the test procedure (Block 58). On the other hand, if the bad count does not equal zero, a new modifier which is one-half of the previous approximation is added to or subtracted from the approximation (Block 59). The determination of whether the change is to be additive or subtractive is made in majority decision circuit 33 which compares the counts in go and no-go counters 27, 28. When the count in counter 27 exceeds that in counter 28, the change is additive. Correspondingly, when the count in counter 28 exceeds the count in counter 27, the change is subtractive.

If it is assumed that the decision is to subtract the next modification, digital to analog converter 21 is loaded through line 25 with the new modifier and another comparison is made in comparator 20. The counters are reset and the voting procedure commences as in Block 48. These steps of the process require an interrogation for a time measurement (Block 60) and the loading of the appropriate time or voltage reference into its corresponding digital to analog converter (Blocks 61, 62). This approximation technique continues. Each successive time that a vote is carried out, the previous modification value is halved until the look-ahead determination is no longer positive and a comparison is made with the pre-set criteria as provided in Block 55 after the votelength value provided to votelength comparator 32 on line 35 is matched by the counts in counters 27, 28.

Logic control unit 12 is notified by voting complete line 37 to check the values in go counter 27 and no-go counter 28 and to compare them to determine if the ratio is greater than or equal to the pre-specified criteria (Block 55). Assuming that the criteria is not satisfied, the process continues by moving to Block 56. The binary approximation procedure continues halving the modifier each time. At each evaluation of the counters when vote length wins as indicated on line 37 and look-ahead does not as indicated on line 36, the two counts are compared to see if they match the criteria.

As soon as counters 27, 28 meet the criteria, it means that the reference value inputted into the comparator is within the noise band of the input voltage Ein to be measured. The procedure follows the path to Block 63 in FIG. 3B. A modifier is set which is equal to the minimum resolution of the system and the procedure changes from a binary approximation method to an incremental or tracking approximation method. The bad count is reset (Block 64). For each succeeding measurement which meets the criteria (Block 55) the digital voltage value fed to reference voltage digital to analog converter 21 is also added in an accumulator in logic control unit 12 (Block 65) until a pre-specified number of successful measurements or votes have been accumulated.

After each successful measurement is completed, the good count is decremented by one (Block 66) and a determination is made as to whether the good count equals zero (Block 67). If the good count does not equal zero, the measuring process continues using the incremental or tracking approximation method by first interrogating as to whether the measurement is for time or voltage (Block 60). Assuming that the good count equals zero, the value of Ein is determined as the answer to be obtained from the procedure. To accomplish this, the value stored in the accumulator is divided by the total number of measurements that were made.

Figure 3A:
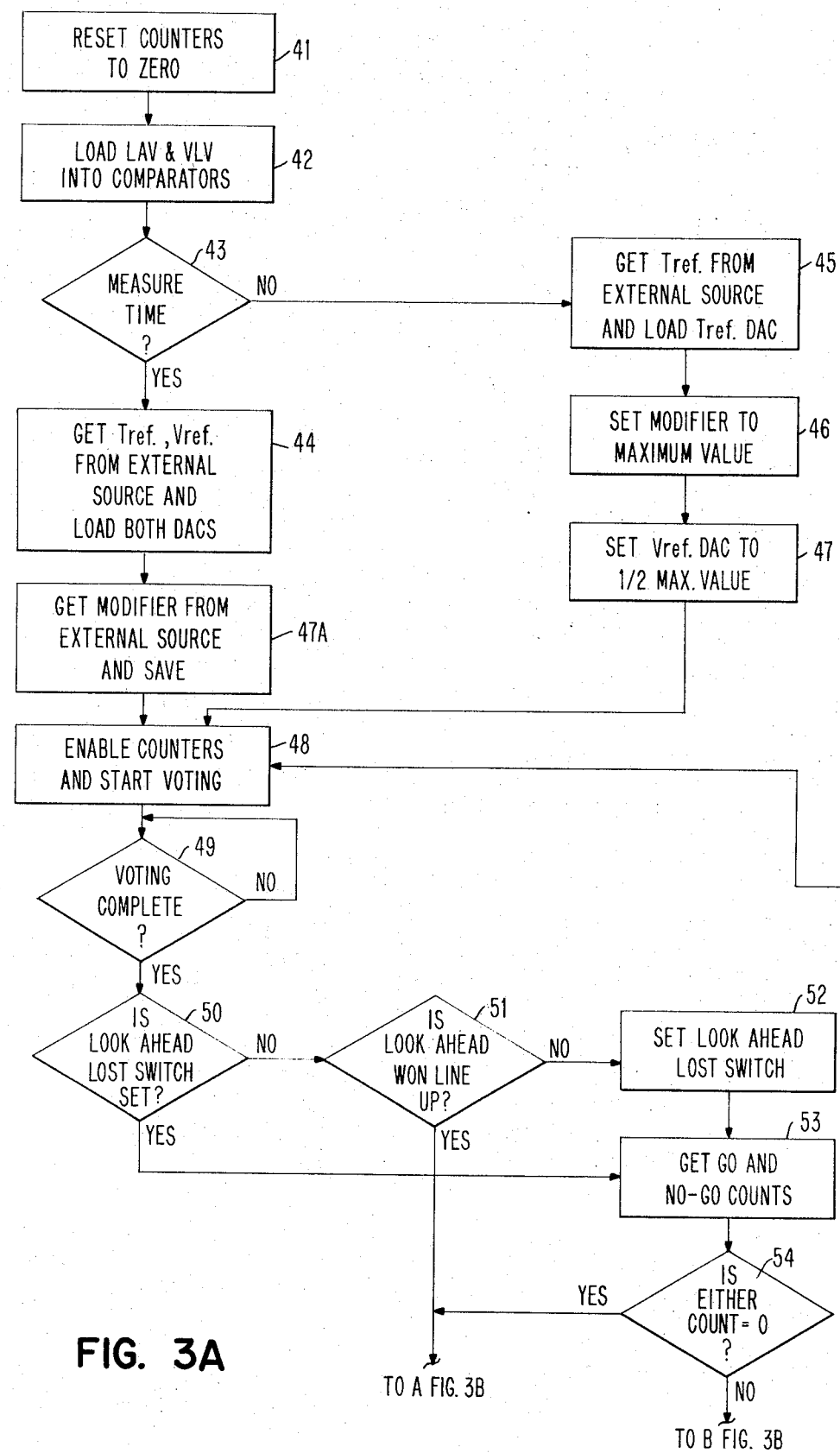
FIGS. 3A and 3B taken together constitute a flow diagram showing the process and the control exercised in performing the measurements according to the principles of the invention.
Figure 3B:
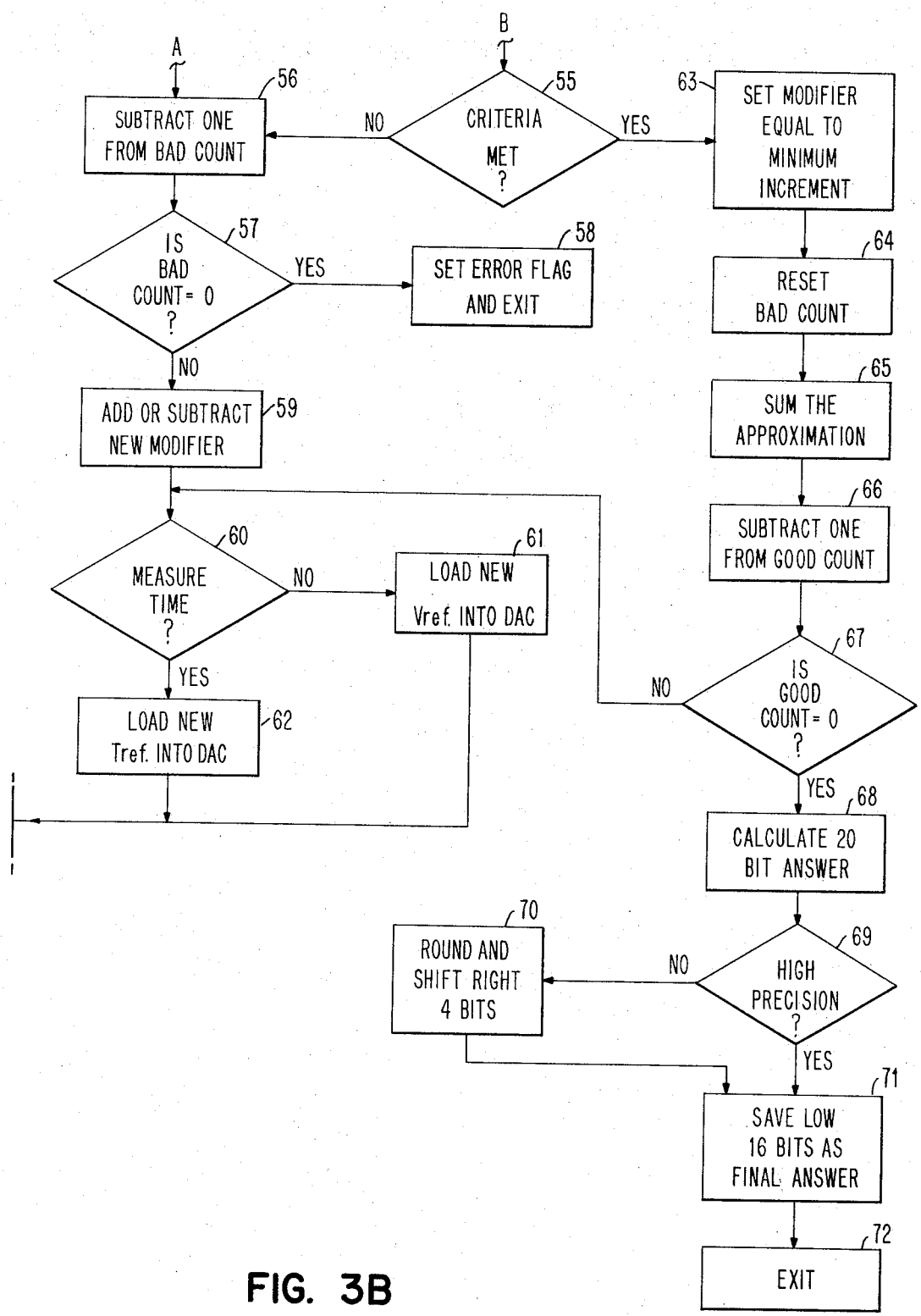

As shown in FIG. 3B by way of illustration, a 20 bit answer, 16 bit measurements can be calculated (Block 68), followed by a determination (Block 69) as to the degree of precision required from the procedure. If high precision is not required, the 20 bit answer is rounded and shifted right four bits (Block 70). If precision is required, the lowest order 16 bits are saved as the final answer (Block 71). In both instances, exit is made from the system through channel interface 11, process controller 10, to be provided at an output device such as the printer 17 (Block 72).

If any measurement, during the series of measurements after the criteria has once been met, does not match the criteria, then the voltage reference digital value is incremented by the least significant bit of the system. The process continues according to incremental approximation method until a predetermined number of good counts is obtained.

The same sequence of events takes place if the measurement mode determined in Block 43 is to measure time. However, in this type of measurement, the reference values are loaded into the voltage reference and time delay digital to analog converters 21, 22 (Block 44). For a time measurement, the first approximation is specified by input data. Thus, as in Block 47A, the modifier is obtained from the external source and provided through process controller 10 and channel interface 11 to logic control unit 12.

As there is always the possibility that the input value is not within the range of the measurement system, a counter is provided referred to as a "bad count" counter to evaluate the number of times it has tried to make a measurement and has not achieved a successful count. The system ceases to count and sends out a signal indicating an error and also an indication that it cannot determine the value it is seeking (Block 58).

A method and apparatus have been described for accomplishing measurements on the value of a voltage or the time of transition. To perform these measurements, the first approximation, first modification and the reference levels are constants derived from the analysis of input data and contained in a storage system such as the storage file 18. The first approximation and reference level are transmitted to the measuring apparatus with a start vote command. A look-ahead value and vote length value have already been loaded into the measuring apparatus. Look-ahead is a voting method defined by having accumulated the prescribed value in either counter and none in the other counter. When the voting is completed, the results of it are transmitted to the logic control unit 12. If look-ahead won is indicated on line 36, a new approximation is computed, based on a binary approximation method. The voting process is repeated until eventually votes are accumulated in the go/no-go counters 27, 28. When both counters contain a value other than zero, voting is terminated when either counter reaches the prescribed vote length as indicated by the value provided on line 35 and the indication on line 37. Analysis is performed on the values contained in the counters to determine if their difference is less than the predetermined criteria which was loaded into the system as a system constant. When the vote difference meets the criteria, the present approximation is within a given range of the mean of the noise distribution and thus within a given range of the value of the parameter being measured. The operation is changed from the binary approximation method to an incremental or tracking approximation method which enhances the accuracy of the measuring process.

Three significant things occur. The modifier is changed to a constant value rather than halving the previous value; the then present value of the then approximation is added to an accumulated value and a register previously loaded with a good count is decremented by one. The new approximation value, which is adjusted by a constant, is provided to the measuring system and the voting commences again. Analysis of the values in the counters is performed each time that voting is stopped because look-ahead won or because a maximum vote length was achieved. Determination is made if the prescribed criteria has been met. When it does, the then present value of the approximation is again added to the accumulator and the good counter is decremented. If the values in the counters do not meet the criteria, there is no addition of that approximation to the accumulator and a new approximation is computed to continue the voting. The process is continued until the good counter is decremented to zero terminating the measuring process.

When the measuring process terminates, the accumulator contains the sum of all values of the measurements meeting the criteria. This sum is divided by the number of good entries to average the approximations meeting the criteria. The criteria against which the measurements take place is related to the system noise. By proper selection of the system constants, a final measurement is arrived at, in the presence of significant amounts of noise, which provides an accurate indication of the parameter being measured.

In performing the measurements, conditions may occur which prevent normal termination of the method. For example, if during the binary approximation, there is a failure to meet the criteria because the parameter is not present or is not within a reasonable field of measurement, a "bad" counter is decremented. This counter is decremented each time a vote did not meet the criteria. The occurrence of a good count resets this counter with a new value. When the "bad" counter decrements to zero, a signal is provided to the process controller to provide an output indication.

Another condition which may occur takes place when the noise band is less than that which could be resolved by the least value of modification achievable by the system. The value of the measurement is bracketed but the available approximation of values cannot be resolved. To avoid this condition, the successive sign reversals of the new value of the modifier are counted. After a predetermined number of these reversals have occurred, one of the values about which the approximation oscillates is accepted as a good value and the voting proceeds in a normal manner.

The method of measurement that has been described first provides for searching to find an unknown signal using a binary approximation. Then as the signal noise region is entered, an incremental approach is used with a preset criteria to remain centered within the noise region. During this latter portion of the process, accumulation is made of a number of measurement results and digital averaging takes place to improve the resolution. The effect of the digital averaging is to permit smoothing of time measurements.

Such a test system method may be modeled in software such as Fortran and run on a typical general purpose digital computer. It may also be performed in discrete hardware such as that found in an IBM System 360.

The results of one such modeling program are set forth in Table I for various values of vote length and DEL (the difference between the vote length and the number of losses which determines the vote ratio criteria).

TABLE 1

Measurement Resolution with 50 Picosecond Noise

| Vote Length | DEL | Ratio Criteria | Average Sample Count | Standard Error Deviation picosecond |
|---|---|---|---|---|
| 1 | — | — | 30 | 37.2 |
| 8 | — | — | 92 | 12.8 |
| 8 | 0 | 0 | 263 | 5.7 |
| 8 | 7 | 0.111 | 240 | 15.9 |
| 16 | 14 | 0.111 | 463 | 11.8 |
| 32 | 28 | 0.111 | 920 | 9.4 |
| 64 | 56 | 0.111 | 1858 | 8.6 |
| 8 | 6 | 0.200 | 251 | 8.4 |
| 16 | 12 | 0.200 | 472 | 6.5 |
| 32 | 24 | 0.200 | 943 | 5.9 |
| 64 | 48 | 0.200 | 1904 | 5.0 |
| 8 | 4 | 0.333 | 316 | 5.0 |
| 16 | 8 | 0.333 | 540 | 3.7 |
| 32 | 16 | 0.333 | 1004 | 3.4 |
| 64 | 32 | 0.333 | 1986 | 2.4 |
| 8 | 3 | 0.384 | 376 | 3.7 |
| 16 | 6 | 0.384 | 677 | 2.8 |
| 32 | 12 | 0.384 | 1129 | 2.2 |
| 64 | 24 | 0.384 | 2039 | 1.8 |
| 8 | 2 | 0.428 | 558 | 3.0 |
| 16 | 4 | 0.428 | 951 | 2.4 |
| 32 | 8 | 0.428 | 1459 | 1.3 |
| 64 | 16 | 0.428 | 2390 | 1.2 |
| 8 | 1 | 0.466 | 1269 | 2.0 |
| 16 | 2 | 0.466 | 1817 | 1.5 |
| 32 | 4 | 0.466 | 2788 | 1.0 |
| 64 | 8 | 0.466 | 4372 | 0.6 |

In all cases, the look-ahead value was four and the number of good values to be averaged was 16 (except the first two entries). The statistical sample size is 66 and the assumed noise is $1\sigma = 50$ ps. The first two entries are used for reference and are obtained by making the good counter equal to one thus representing results which would be obtained if the algorithm were not used. The results for a vote length = 1 represents the most elementary binary search method without majority voting; the results for a vote length = 8 represents the binary search with majority voting. The average sample count is the statistical average of the number of samples required to approximate the measurement and, for a given system, is a relative measure of the time required to produce a measurement. The standard error deviation is the statistical deviation ($1\sigma$) of the error computed by the modeling program where the error is defined as the difference between a value representing the modeled transition and the modeled measurement. The smaller values of the deviation indicate a higher, and therefore, more desirable precision of measurement. Measurements with higher precisions require larger samples.

While this invention has been particularly described with reference to the preferred embodiments thereof, it will be understood by those skilled in the art that the foregoing and other changes in form and detail may be made therein without departing from the spirit and scope of the invention.

What is claimed is:

1. A method for determining the value of an unknown analog quantity with respect to known quantity in the presence of an unwanted parameter by measurement apparatus coupled to a computing system having said known quantity, a measuring reference and a prescribed criteria related to said parameter all stored therein, comprising the steps of loading said known quantity, measuring reference and prescribed criteria and a first approximation of said unknown quantity into said measurement apparatus, performing a first set of successive comparisons between said approximation and unknown quantity with respect to said known quantity for said measuring reference until said criteria is satisfied, each such successive comparison after the first being made with a digitally modified approximation of the preceding approximation, performing a second set of successive comparisons between said last digitally modified approximation and unknown quantity with respect to said known quantity for a predetermined number of said measuring reference, each such successive comparison being made with a tracking modified approximation of the preceding approximation, and calculating the value of said unknown quantity from the results of said second set of comparisons.

2. In the method of claim 1, wherein the unknown analog quantity is a voltage which is measured at a fixed cyclically recurring time loaded into said apparatus, said measurement being made in the presence of noise and in which in said first set of comparisons a digitally modified approximation of said voltage is successively compared with said voltage until said criteria is satisfied and in which said second set of comparisons is performed by track approximating the value of said voltage.

3. In the method of claim 1, wherein the unknown analog quantity is the time at which a fixed value of voltage occurs in the presence of noise, said fixed value of voltage being loaded into said apparatus and in which said first set of comparisons are performed with a digitally modified approximation of said time by successive comparisons with said time until said criteria is satisfied and in which said second set of comparisons is performed by track approximating said time.

4. In the method of claim 1, wherein the first set of successive comparisons are made by binary digital approximations of said unknown quantity.

5. In the method of claim 1, wherein the second set of successive comparisons are made by incremental approximations of said unknown quantity.

6. In the method of claim 5 wherein said measuring reference is a vote length with each vote being the equivalent of a comparison made between the unknown analog quantity and an incremented approximation of said quantity, said vote length being achieved for a predetermined number of times and wherein said method further comprises the step of accumulating the values of all of said incremented approximations from which the value of said quantity is calculated.

7. In the method of claim 1 and further comprising the steps of loading a second measuring reference into said apparatus, said second reference being related to the measuring limitations of said apparatus, and performing a third set of comparisons between said first approximation and unknown quantity prior to said first set of comparisons as long as said second reference is satisfied.

8. In the method of claim 7, wherein said second reference is a look ahead value provided by said computing system for reducing the number of comparisons to be performed by shortening the time to bring said approximation within the measuring limitations of said apparatus, said look ahead value being satisfied when all of the comparisons of said third set are of one type.

* * * * *